United States Patent [19]

Du et al.

[11] Patent Number: 6,078,982

[45] Date of Patent: Jun. 20, 2000

[54] PRE-LOCKING SCHEME FOR ALLOWING CONSISTENT AND CONCURRENT WORKFLOW PROCESS EXECUTION IN A WORKFLOW MANAGEMENT SYSTEM

[75] Inventors: Weimin Du, San Jose; Ming-Chien Shan, Saratoga, both of Calif.; Ahmed Elmagarmid, Lafayette, Ind.

[73] Assignee: Hewlett-Packard Company, Palo Alto, Calif.

[21] Appl. No.: 09/047,248

[22] Filed: Mar. 24, 1998

[51] Int. Cl.[7] ..................................................... G06F 13/14
[52] U.S. Cl. ............................. 710/200; 707/8; 710/240; 710/244
[58] Field of Search ............................. 395/726; 710/200, 710/240, 244; 711/145; 713/300; 709/103, 104, 201; 707/8; 705/8

[56] References Cited

U.S. PATENT DOCUMENTS

| | | | |
|---|---|---|---|
| 4,627,019 | 12/1986 | Ng ................................................. | 707/8 |
| 5,226,143 | 7/1993 | Baird et al. ............................... | 711/145 |
| 5,280,612 | 1/1994 | Lorie et al. ................................. | 707/8 |
| 5,280,619 | 1/1994 | Wang ........................................ | 710/200 |
| 5,287,521 | 2/1994 | Nitta et al. ............................... | 710/700 |
| 5,339,427 | 8/1994 | Elko et al. ............................... | 709/103 |
| 5,596,754 | 1/1997 | Lomet ....................................... | 710/200 |
| 5,692,178 | 11/1997 | Shaughnessy ............................... | 707/8 |
| 5,721,943 | 2/1998 | Johnson ................................... | 713/300 |
| 5,826,239 | 10/1998 | Du et al. ..................................... | 705/8 |
| 5,870,545 | 2/1999 | Davis et al. ............................. | 709/201 |
| 5,872,980 | 2/1999 | Derrick et al. ........................... | 395/726 |
| 5,878,414 | 3/1999 | Hsiao et al. ............................... | 707/8 |
| 6,009,405 | 12/1999 | Leymann et al. ........................... | 705/9 |

OTHER PUBLICATIONS

Sheth et al., "On Transactional Workflows", 1993, vol. 16(2), pp. 37–40, IEEE.

Tang et al. "Transaction–Oriented Work–Flow Concepts in Inter–Organizational Environments", 1995, pp. 250–259, CIKM '95, Baltimore MD USA, ACM.

Georgakopoulos et al, "A Framework for Enforceable Specification of Extended Transaction Models and Transactional Workflows", 1994, vol. 3(3), pp. 225–253, Intl. J. of Intelligent & Cooperative Info. Systems.

Alonso et al., "Advanced Transaction Models in Workflow Contexts", 1996, pp. 574–581, IEEE.

*Primary Examiner*—Thomas C. Lee
*Assistant Examiner*—Katharina Schuster

[57] ABSTRACT

A system for allowing consistent execution of a workflow process in a computer-enabled workflow management system is described. The system includes a workflow process database accessible by the workflow process. The workflow process includes at least one sequence of workflow actions, having at least one set of parallel workflow actions and being configured as a plurality of nodes interconnected by arcs. Each node defines at least one of the workflow actions and reading and writing data items when executing the workflow actions. A first module is provided to lock all data items in the workflow process database that are specified for access by the workflow process from being accessed by other workflow processes during execution of the workflow process before the execution of the workflow process is commenced. A second module is provided to release all the locked data items from being locked after the workflow process has been executed such that execution consistency and concurrency of the workflow process is maintained. A computer implemented method for allowing consistent execution of a workflow process in a computer-enabled workflow management system is also described.

10 Claims, 8 Drawing Sheets

PRE-LOCKING SCHEME FOR ALLOWING CONSISTENT AND CONCURRENT WORKFLOW PROCESS EXECUTION IN A WORKFLOW MANAGEMENT SYSTEM

BACKGROUND OF THE INVENTION

1. Field of the Invention

The present invention pertains to workflow process management. More particularly, this invention relates to a pre-locking scheme for allowing consistent and concurrent workflow process execution in a workflow process management system.

2. Description of the Related Art

Workflow process re-engineering is the fundamental rethinking and re-implementation of workflow processes to achieve levels of quality, cost, throughput and service that have not been accomplished before. Workflow process management (WFPM) software, or more accurately, middleware, provides the enabling technologies for actually performing workflow process re-engineering. WFPM supports flexible solutions for the management of enterprise-wide operations, including workflow process control, automation and monitoring, resource allocation, authorization and authentication, task initialization and data exchange, and end-to-end communication and security.

WFPM can also be used to perform a wide range of tasks. For example, WFPM systems can manage existing non-automated legacy or work processes. As another example, WFPM systems can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status. Finally, they can provide history information in the form of an audit trail for completed workflow processes and collect statistical data for process and resource bottleneck analysis, flow optimization and automatic workload balancing.

Workflow process execution should be correct, efficient and flexible. In addition, workflow process execution should also be consistent. Workflow processes involve coordinated execution of activities performed by workflow resources (e.g., a person, a computer-based application, or an instrument). Workflow process execution involves accessing data items both internal and external to the workflow engine. Internal data items of each process execution is stored in a separate workflow process database that is managed by the workflow engine. External data items are stored in multiple action databases that are managed by external database management systems and are accessible by workflow activities, but not accessible by the workflow engine. The state of a workflow system is defined by the values of all data items involved in workflow process executions. A workflow system state is consistent if data items accessed and managed by different systems represent the same view of real world. For example, in a product design workflow system, the status of product design in the workflow process database managed by the workflow engine (for routing) should be consistent with that in the action database managed by external design system. A workflow process execution is consistent if each individual step sees a consistent workflow system state.

A prior solution for ensuring workflow process consistency is to adopt the concurrency control protocols used by database management systems. This solution executes each of the workflow activities as ACID transactions and employs concurrency control protocols such as two-phase locking to prevent undesired interaction among parallel activities. The approach ensures serializable execution of workflow activities.

One problem associated with this prior approach is that it requires sequential execution of parallel but conflicting workflow activities. While sequential execution of conflicting database operations (e.g., read and write) is acceptable, sequential execution of conflicting workflow activities is not acceptable, as they are generally long running.

Thus, there is a need for a system and method for maintaining serializable workflow process execution and allowing a higher concurrency degree than normal database concurrency control protocols.

SUMMARY OF THE INVENTION

One feature of the present invention is to allow high degree of concurrency and consistency in a workflow process.

Another feature of the present invention is to provide a coordination protocol that is flexible to meet different consistency requirements (e.g., for parts of or the entire workflow system).

A further feature of the present invention is to provide a coordination protocol that ensure serializable process execution and allows workflow activities to read and write at any time and in any order.

A system for allowing consistent execution of a workflow process in a computer-enabled workflow management system is described. The system includes a workflow process database accessible by the workflow process. The workflow process includes at least one sequence of workflow actions, having at least one set of parallel workflow actions and being configured as a plurality of nodes interconnected by arcs. Each node defines at least one of the workflow actions and reading and writing data items when executing the workflow actions. A first module is provided to lock all data items in the workflow process database that are specified for access by the workflow process from being accessed by other workflow processes during execution of the workflow process before the execution of the workflow process is commenced. A second module is provided to release all the locked data items from being locked after the workflow process has been executed such that execution consistency and concurrency of the workflow process is maintained.

A computer-implemented method is disclosed for consistently executing a workflow process in a workflow management system. The method includes the step of allowing each of a plurality of interconnected nodes of the workflow process which carry out multiple associated workflow actions including at least one set of parallel actions of the workflow process to read and write data items to and from the workflow database in carrying out the workflow actions associated with the respective nodes of the workflow process. The method also includes the step of locking each of the data items to be accessed by the workflow process before execution of the workflow process is commenced. All the locked data items are then released from being locked after the workflow process has been executed such that execution consistency and concurrency of the workflow process is maintained.

Other features and advantages of the present invention will become apparent from the following detailed description, taken in conjunction with the accompanying drawings, illustrating by way of example the principles of the invention.

DETAILED DESCRIPTION OF THE INVENTION

According to one embodiment of the present invention, a coordination scheme is provided to allow consistent execution of a workflow process (e.g., the workflow process 18) in a workflow process management system (i.e., the system 10). The workflow process includes at least one sequence of workflow actions, having at least one set of parallel workflow actions and being configured as a number of nodes interconnected by arcs. Each node defines and executes at least one of the workflow actions. In carrying out the workflow actions of the workflow process, the nodes accesses the workflow process database to read and write data items.

The pre-locking coordination scheme in accordance with one embodiment of the present invention allows consistent execution among the workflow actions by locking all the data items to be accessed by the workflow process from being updated prior to the execution of the workflow process and then releasing the locked data items after the workflow process has been executed such that a higher concurrency degree than conventional database concurrency control protocols is maintained. This ensures serialization of the workflow process.

Workflow Process Management System

Figure 1:
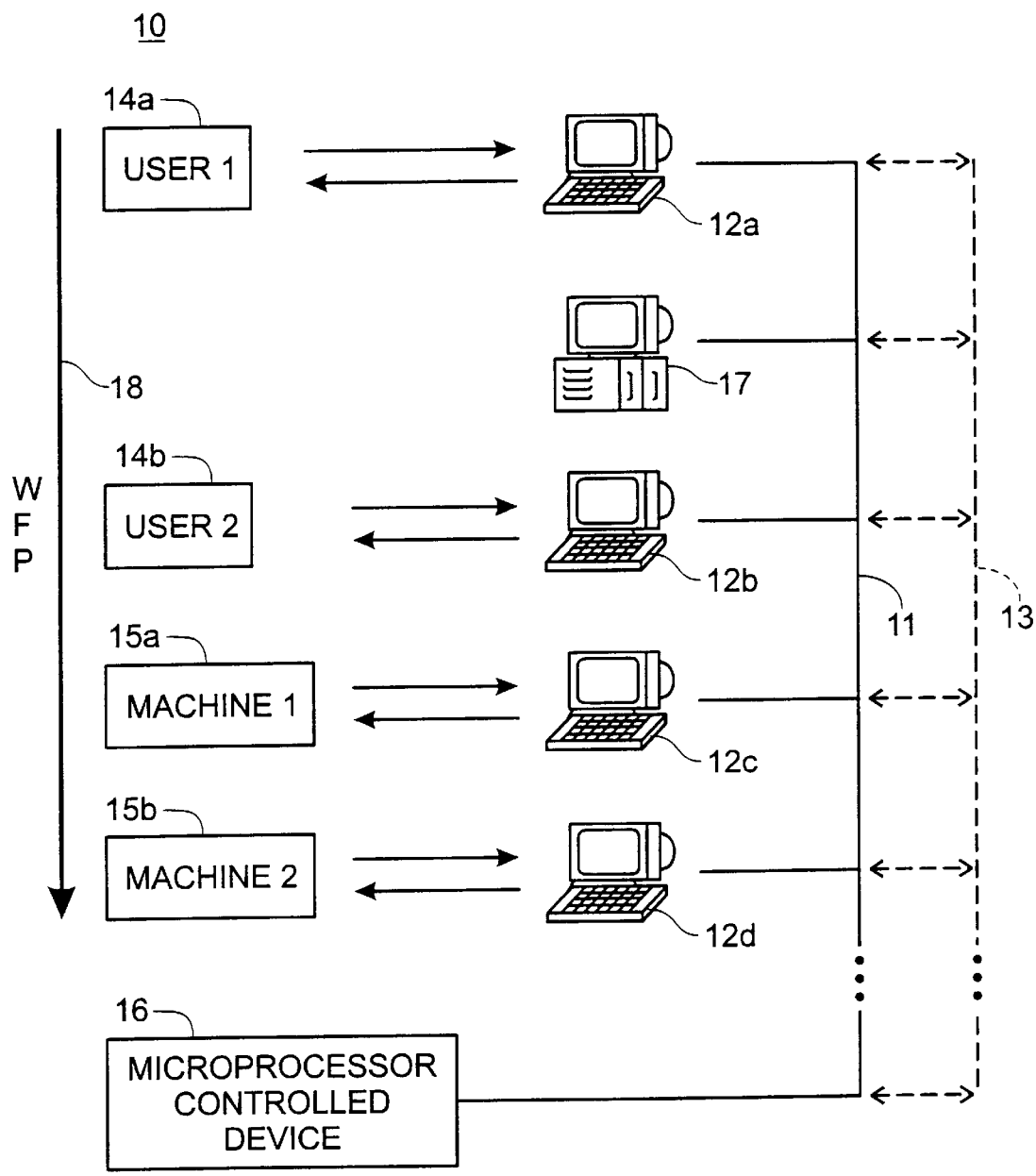
FIG. 1 is a block diagram of a process flow management system implemented in a network of computers coupled to a plurality of users and machines for management and control of workflow process activities.

FIG. 1 shows a block diagram of a workflow process management (WFPM) system 10 implemented in a network 11 of computer systems 12a–d coupled to a plurality of users 14a–b and machines 15a–b for management and control of workflow process activities. Each computer system 12a–d is shown coupled with a single user 14a–b or machine 15a–b, but multiple users or machines or combinations thereof can also be employed. The WFPM system 10 is shown from an enterprise perspective with the control and coordination of each of the computer systems 12a–d being accomplished by computer software, preferably object-oriented software, executed as a distributed application by the computer systems 12a–d. Optionally, workflow process activity information, such as resource data and rules, can be stored in a database on a centralized WFPM server 17 which is accessible by the computer systems 12a–d over the network 11 or can be stored in a plurality of databases on each of the computer systems 12a–d.

Each workflow process 18 includes a sequence of activities or actions, each of which can be performed by one of the computer systems 12a–d in conjunction with an associated user 14a–b or machine 15a–b, although some activities can be performed by microprocessor-controlled devices 16 (only one is shown in FIG. 1), such as a telephone or facsimile machine, printing device or similar self-controlling mechanism. In addition, each of the machines 15a–b can be a work instrument or computer resource.

The workflow process 18 can span several business organizations (only one is shown in FIG. 1) with multiple activities potentially performed in parallel. In such cases, the WFPM system 10 acts as the "superstructure" that ties together disparate computer systems 12a–d whose business purposes are interconnected. The WFPM system 10 provides procedural automation 13 of the workflow process 18 by managing the sequence of process activities and the invocation of appropriate user 14a–b, machine 15a–b or microprocessor-controlled device 16 resources associated with the various activity steps.

Workflow Process Specification

The procedural automation 13 of the workflow process 18 involves the high-level specification of individual workflows (example shown in FIG. 3) which provides the operational "glue" and environment support needed by the WFPM system 10 for managing and automating the workflow process 18, recovering from failures and enforcing consistency. As further described herein below, the WFPM system 10 also enforces various administrative policies associated with resources and work.

HP OpenPM

Figure 2:
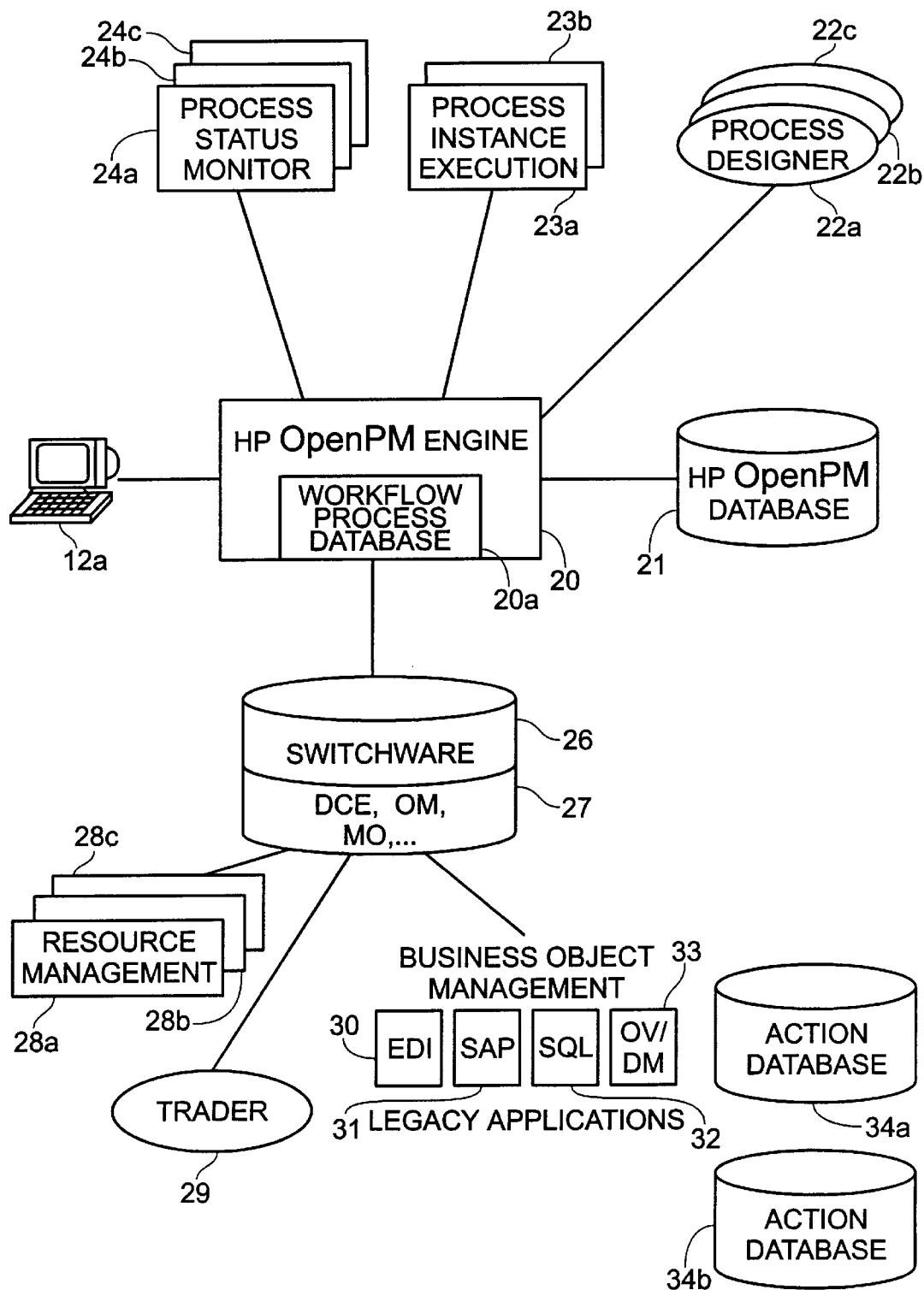
FIG. 2 is a block diagram of a hardware and software machine for a typical node in the network of FIG. 1 showing the architecture of an example of process flow management middleware employing the present invention.

FIG. 2 is a block diagram of a hardware and software machine for a typical node 12a in the network 11 of FIG. 1 showing, by way of example, an architecture for WFPM middleware employing the present invention. An example of middleware suitable for implementing the present invention is the Hewlett Packard (HP) OpenPM system. HP OpenPM is an open, enterprise-capable, object-oriented WFPM system developed by Hewlett Packard Co., Palo Alto, Calif., for managing process activities that support complex enterprise processes in a distributed, heterogeneous computing environment. The use of a WFPM system 10 implemented in middleware represents a substantial evolution over traditional workflow technologies. HP OpenPM provides a generic framework and complete set of services for workflow process management using a middleware-based approach with an emphasis on performance, availability, scalability and system robustness.

The overall architecture of the HP OpenPM system is depicted in FIG. 2. The core is the HP OpenPM engine 20, which supports five interfaces. The interfaces enable the HP OpenPM engine 20 to interact with workflow process designer 22a–c, workflow process instance execution 23a–b, workflow process monitor 24a–c, workflow management 28a–c and business object management modules 30, 31, 32, 33. In addition, worldwide web client support is provided by each individual network node 12a which can execute middleware modules expressed in platform-independent languages, such as Java Applets and HTML code. An HP OpenPM database 21 is maintained on the centralized WFPM server 17 (shown in FIG. 1) for use by the HP OpenPM engine 20.

The workflow process 18 is specified by the process design modules 22a–c via the workflow process definition interface. A workflow process database 20a is used for storing data items for carrying out the workflow process 18. The workflow process database 20a is accessible by the HP OpenPM engine 20. An instance of the workflow process 18 can be started, controlled or stopped by the process instance execution modules 23a–b via the process execution interface. Status information of each process instance and load information for the WFPM system 10 can be queried using the process status monitor modules 24a–c via the process status monitoring interface. The workflow management interface is used to allocate, at run time, execution resources to a task, according to the policies defined by the organization (including authorization and authentication) and the availability of the resources using the workflow management modules 28a–c. Interaction with the external world, such as invoking an application or action, controlling an instrument or delivering a work order to a person's electronic mail in-box, is performed by the various business object management modules 30, 31, 32, 33.

HP OpenPM Process Model

A workflow process is described as a directed graph P=<N,A> comprising a set of nodes N={$n_1, n_2, \ldots$}, and a set of arcs A¥N$^2$ connecting nodes in N.

Figure 3:
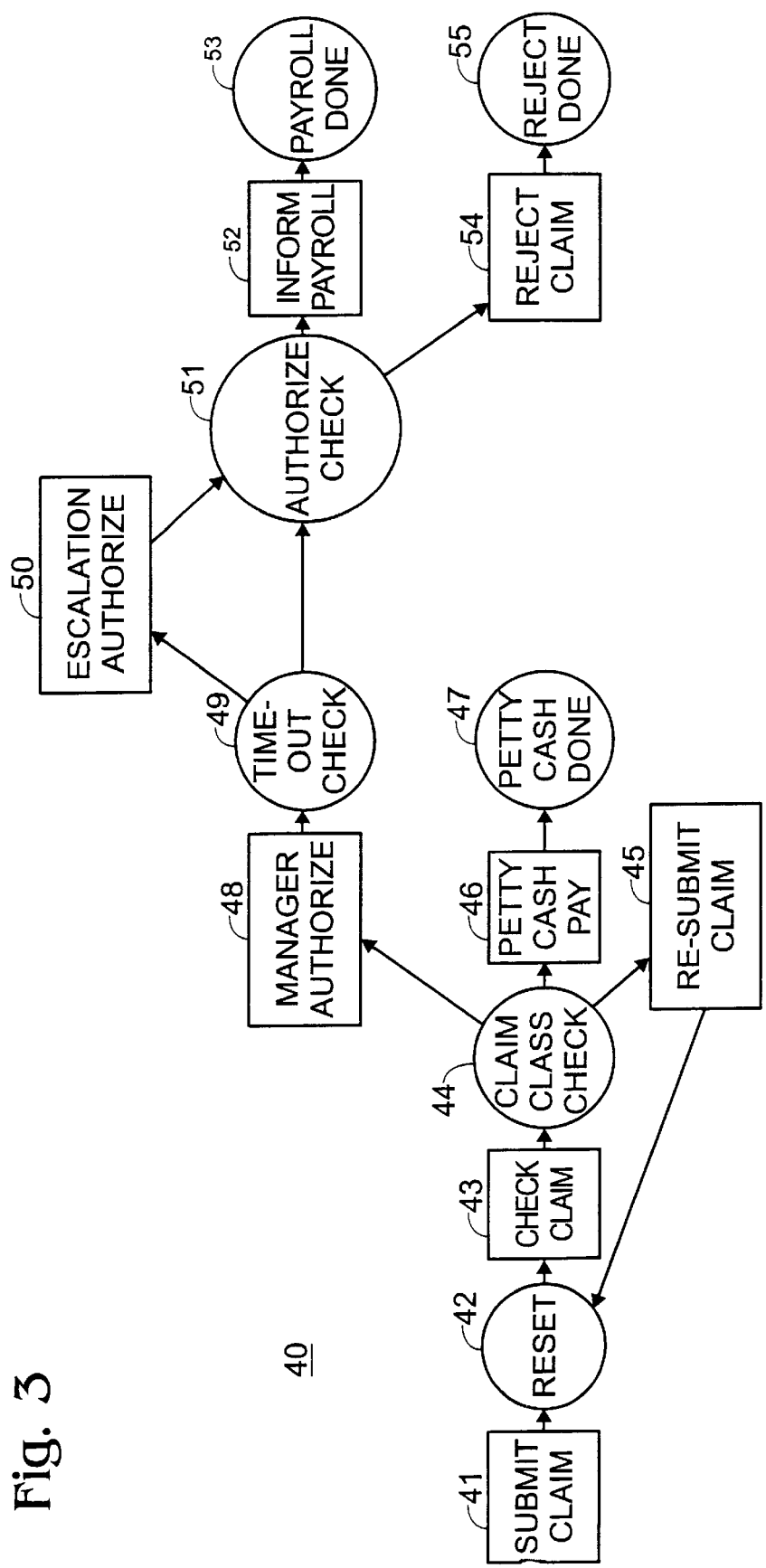
FIG. 3 is a computer display of the user interface for the user of the machine of FIG. 2 to interact with the process flow management system, the display showing an example of a process flow diagram.

In general, a workflow process 18 is a description of the sequencing, timing, dependency, data, physical agent allocation, business rule and organization policy enforcement requirements of process activities needed to enact work. FIG. 3 shows, by way of example, a workflow process 18 which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the normal execution flow of process activities and form a directed acyclic graph 40. Successful completion of a node at the source end of a forward arc triggers the starting of the node at the destination end of the forward arc.

Reset arcs are used to support repetitions or explore alternatives in the workflow process 18. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects and provision of input data for the business objects and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of the process 18. A process activity is mapped to the invocation of an operation on business objects during the execution of the process and each process activity can represent a manual operation by a human or a computerizable task to execute legacy applications 30, 31, 32, 33 (shown in FIG. 2), access action databases 34a, 34b (also shown in FIG. 2), control instrumentation, sense events in the external world or effect physical changes. A process activity definition includes a forward activity and optionally, a compensation activity, a cancel activity, a workflow management activity, timeout and deadline information and input and output data.

Rule nodes 42, 44, 47, 49, 51, 53, 55 are used to specify workflow processes 18 that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to fired and performs or requests its associated activity. When the inward arc is fired on a work node 41 in the fired state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process, there is a workflow process database defined by a workflow process designer module 22a (shown in FIG. 2). For example, the workflow process data base 20a is provided for the workflow process 18. The workflow process database is used to provide initial data for the creation of process instances. At run time, based on the process database template and read/write lists of activities defined in the workflow process (e.g., the process 18), HP OpenPM will generate a workflow process database (e.g., the workflow process database 20a) for each process instance to facilitate data passing between activities and the HP OpenPM engine 20.

HP OpenPM Process Execution

Figure 4:
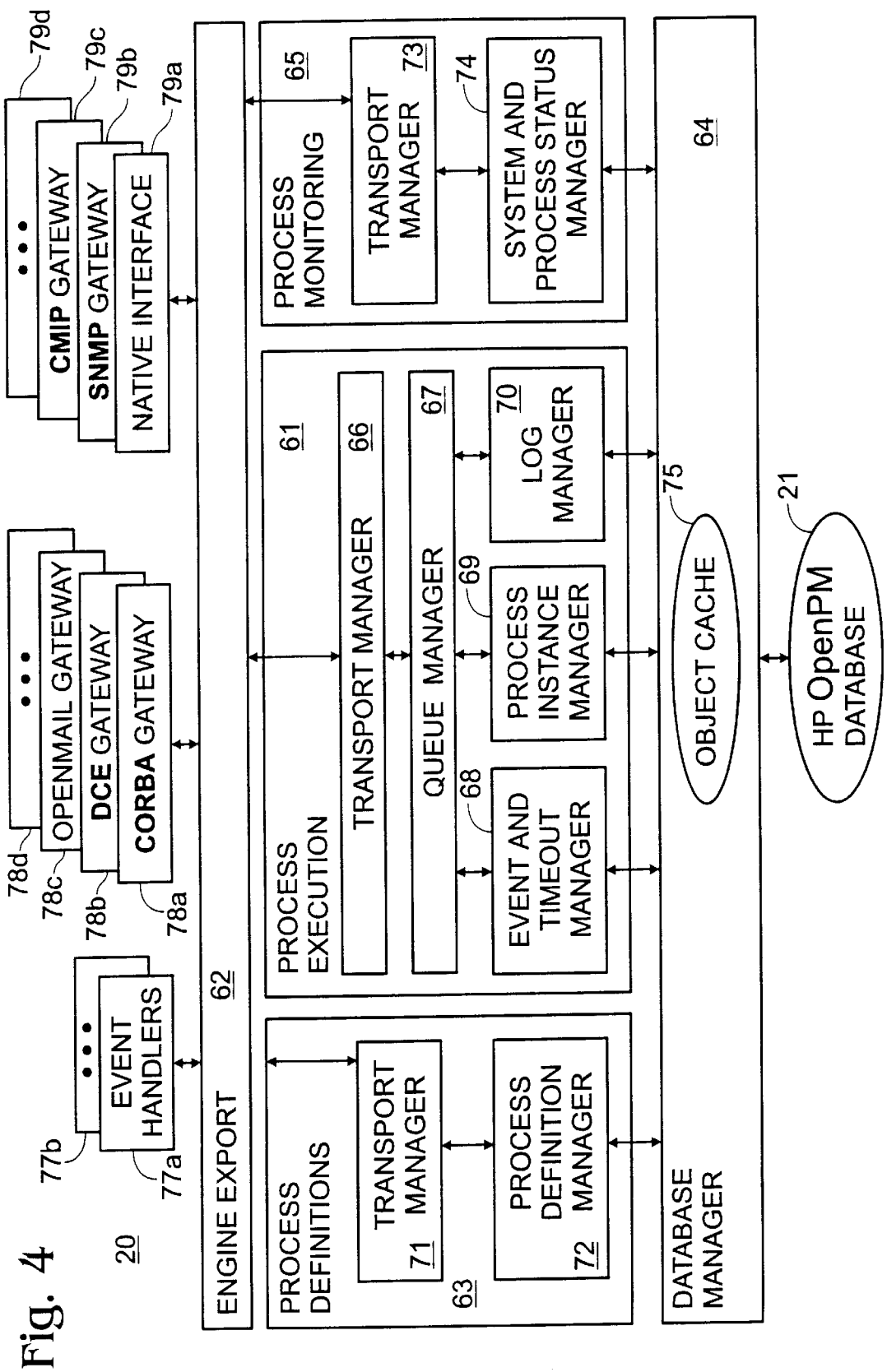
FIG. 4 is a block diagram of the preferred form of workflow process software engine that coordinates execution flow of the managed process.

FIG. 4 is a block diagram of the preferred form of a workflow process software engine, such as the HP Open PM engine 20, that coordinates execution flow of the workflow processes 18. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged to facilitate forward rolling of incomplete workflow processes 18 at system restart time in the event of a system failure or to facilitate a support activity compensation process in the case of a process activity failure. In addition, the HP OpenPM engine 20 allows flexible specification of compensation scopes and actions, such as compensation activity or cancel activity, to support various application needs.

In the HP OpenPM engine 20, different versions of similar workflow processes 18 are supported by the engine 20 under the concept of a process group. A user can designate a particular version as the default version to be used when no specific version is requested at the time a workflow process instance is created.

To monitor the progress of running process activities and support system management, the HP OpenPM engine 20 maintains a comprehensive log of all events using a log manager 70 and provides a native interface 79a as well as an SNMP 79b and CMIP 79c gateways to facilitate integration with the HP OpenView environment. The formats and contents of the logged information can be customized to support specific application needs.

Each workflow process execution is associated with a data structure (i.e., the workflow process database) which is a list of process specific and process relevant data used by the workflow engine. As described above, the HP Open PM engine 20 includes the workflow process database 20a for the workflow process 18. The workflow process database is shared by all work and rule nodes. A work node accesses the workflow process database in two phases. First, it reads data items from the container when it starts execution and passes the data to the associated workflow activity as input parameters. Then, after the activity execution completed and returned, it writes the execution results back into the workflow process database, making them available to subsequent nodes. A rule node may read data items in the container for rule evaluation. It may also update data items in the workflow process database as rule actions.

Consistency Requirements

Consider any two activities of a workflow process. There are four cases with respect to the data dependencies between the two activities.

1. They do not access common data items.
2. There is a static data flow from on activity to the other. In other words, execution of one activity requires results produced by the other activity and the data flow is pre-specified.
3. There is a dynamic data flow between the two activities. In other words, the two activities have to be run one after the other, so that the latter can use the results produced by the former, but the order of the execution (i.e., the direction of the data flow) is not important and thus not pre-specified.
4. There is no data flow between the two activities, even though they access common data items. In other words, the execution of one activity does not require the results produced by the other, and thus they can be run in parallel.

There is no consistency issue in the first instance, as the two activities do not conflict with each other. In the second case, the best way to ensure the pre-specified data flow is to explicitly specify the execution order in the process definition using arcs. In the third case, serializable execution is necessary to ensure proper data flow and consistent data access. This invention deals with this situation.

As is known, serializability can be ensured using traditional database concurrency control protocols (e.g., two-phase locking). The idea is to schedule conflicting data accesses by the two activities in a consistent order. Two workflow activities can conflict with each other in three different ways:

1. write-read conflict. In this case, an activity first writes a data item and then another activity reads the same data item.
2. read-write conflict. In this case, an activity first reads a data item and then another activity writes the same data item.
3. write-write conflict. In this case, two activities write the same data item one after another.

Using traditional database concurrency control protocols, no conflicting operations of an activity will be scheduled until all conflicting operations of the other activities that precede it in the serialization order have completed. Thus, if two parallel activities of a workflow process both read and write the same data item in the workflow process database, they will have to be scheduled sequentially. Because each workflow activity reads the process database before invoking the external application and writes the results back to the process database after invoking the external application, this implies sequential execution of external applications associated with the two workflow activities. This is, however, clearly undesirable. Parallel executions of workflow activities should be allowed as much as possible.

Allowing concurrent execution of workflow activities with write-write conflict operations without compromising serializability can be achieved if the workflow activities access only the process database and update the process database in an atomic step. Note that atomic update to the process database by each of the workflow activities only guarantees serializable execution with respect to the process database. It does not guarantee the entire workflow database which includes both the workflow process database and the external action databases. Two workflow activities with write-write conflict operations may access the process database in a serializable way, and then access the action databases in a serializable way, respectively. But the two serialization orders may be different and inconsistent, resulting in inconsistent overall workflow execution.

In addition, atomic update to the process database may be a too harsh restriction for many applications in which external applications need to send intermediate results back to the workflow engine. As a result, a workflow activity may need to update the process database during a long period (e.g., a number of minutes or hours).

Consistent Process Execution

The pre-locking protocol in accordance with one embodiment of the present invention allows concurrent execution of write-write conflict operations of two activities. Thus, two workflow activities can be performed concurrently if they do not have write-read and read-write conflicts with respect to each other.

The present invention enables consistent workflow process execution by ensuring execution atomicity of activities of a single workflow process. More specifically, a pre-locking coordination scheme is used to allow a workflow process to preserve the consistency of workflow environments even if multiple activities (of the same process) have to interleave and update common data items concurrently. As described above, this problem is not trivial, as activities access data items both internal and external to the workflow engine but such accesses are not coordinated by a single management system as in typical database systems. The access to the internal data is managed by the workflow engine while access to the external data is managed by external database systems. Therefore, coordination of internal and external data accesses is needed so that data consistency is maintained but without requiring sequential execution of workflow activities.

In accordance with one embodiment of the present invention, the pre-locking coordination scheme is used to ensure consistent and yet concurrent execution of a workflow process (e.g., the process 18). The coordination scheme is executed by the WFPM system 10. The coordination scheme allows two conflicting activities of a workflow process to run concurrently, and yet ensures execution consistency of the workflow process. The coordination scheme according to the present invention allows for concurrent execution of conflicting workflow activities and yet does not abort the completed activities. The idea is to take advantage of the special features of a workflow activity when accessing the workflow process database so that conflicting operations can be performed in a more flexible way. This is done by (1) pre-locking all internal data items an activity transaction accesses, (2) reading or updating the workflow process database in atomic steps, and (3) releasing the locks after execution of the workflow process is completed.

For a given work node, the data items it accesses in the workflow process database for the particular workflow process are pre-specified as part of the process specification. It is, therefore, possible for the workflow engine (e.g., the engine 20 of FIG. 2) to obtain locks on all the data items before the workflow activity is actually started. This feature allows the workflow engine to detect undesired conflicts at a very early stage. By preventing undesired read-write and write-read conflicts, it is possible to resolve the inconsistency caused by undesired write-write conflicts, thus allowing the workflow engine to freely schedule conflicting write-write operations.

First, write-read conflicts can be easily detected, as all activity transactions pre-lock the data items the node reads and writes. A request to obtain the read lock on a data item will not be granted if the data item has already been locked by other activity transactions for write. Activity transactions failing to obtain a read lock will have to wait until the conflicting transactions finish and release the lock.

Similarly, undesired read-write conflicts can also be avoided. This is done by requiring an activity transaction to hold its read locks until it completes its execution. The read locks prevent other activity transactions from updating the data items it has read.

As a result, write-write conflict operations can be freely scheduled. Possible inconsistency can easily be resolved as no other transaction sees the inconsistent view. FIG. 9 shows the operation of the coordination protocol with respect to two work nodes $\alpha_1$ and $\alpha_2$ with conflicting write-write operations, which will be described in more detail below. FIG. 9 diagrams the operation of the nodes $a_1$ and $a_2$, executing and updating the workflow process database under the coordination scheme shown in FIG. 5 through FIG. 8.

As can be seen from FIG. 9, suppose that node $\alpha_1$ is serialized before node $\alpha_2$ in the external database accesses. There are two cases when updating the workflow process database. If node $\alpha_1$ returns first and updates the workflow process database before node $\alpha_2$, the overall execution is consistent. On the other hand, if node $\alpha_2$ returns first and updates the workflow process database before node $\alpha_1$, the conflicting write operation of node $\alpha_1$ is now obsolete and can be safely ignored. This is possible because no other activity transactions are expected to read this value (recall that write-read conflicts are not allowed).

FIG. 5 through FIG. 8 show in block diagram form the pre-locking coordination scheme. As can be seen from FIG. 5, the coordination scheme starts at the step 170. At the step 171, the pre-locking step is performed. At the step 172, the scheme causes the associated activity to be executed with the data item. Then the step 173 is executed at which the commit step is performed. At this step 173, the locks are also released.

Figure 5:
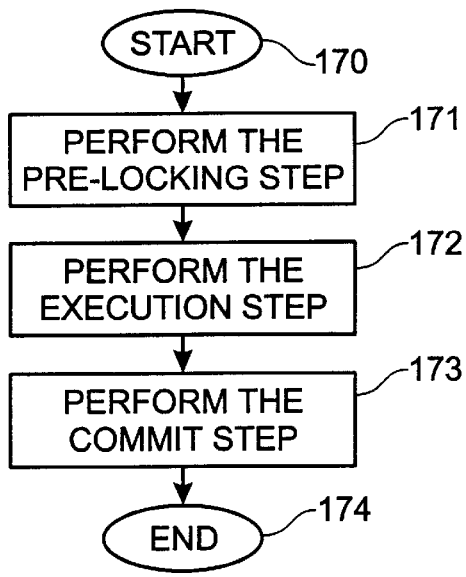
FIGS. 5–8 show the pre-locking coordination protocol to effect workflow process consistency according to the invention.
Figure 6:
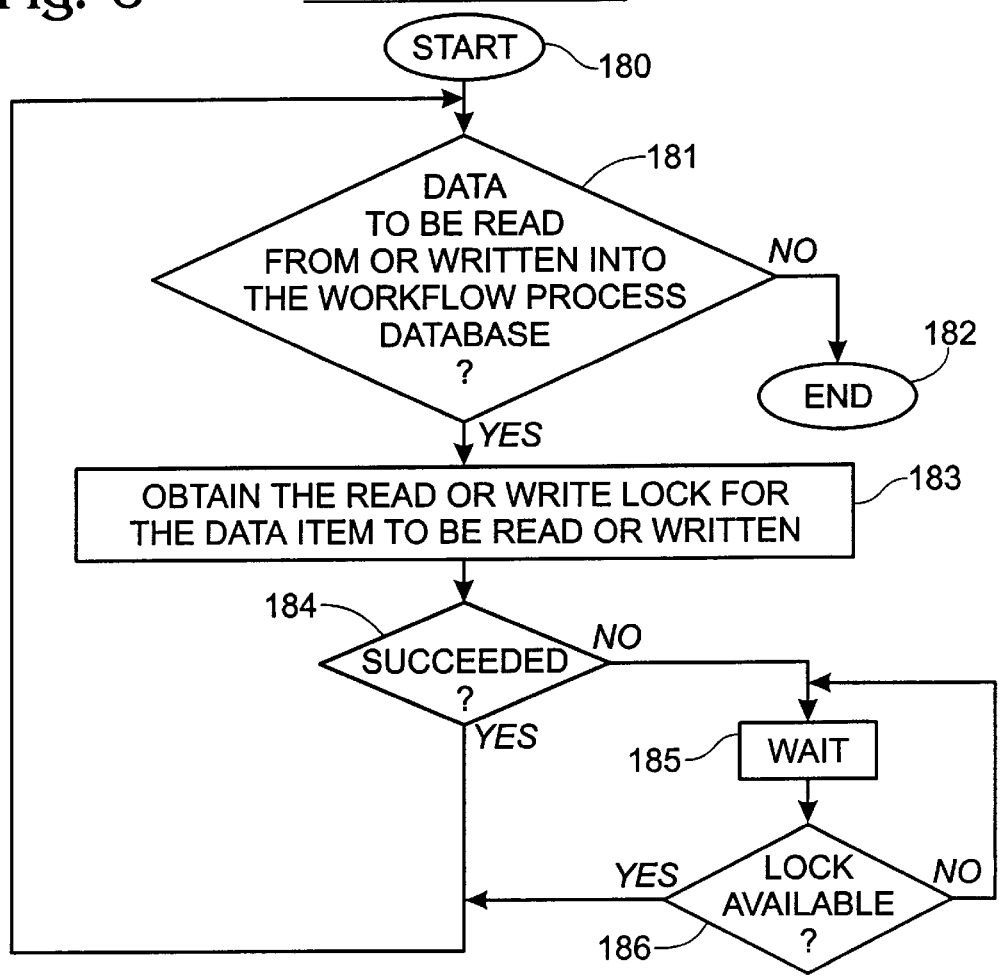

FIG. 6 shows the routine of the pre-locking step 171 of FIG. 5. As can be seen from FIG. 6, the routine starts at the step 180. At the step 181, it is determined if more data items need to be read or written. If so, the step 183 is executed. Otherwise, the routine stops at the step 182.

At the step 183, the read or write lock of the data item to be read or write is obtained. At the step 184, it is determined if the lock operation at the step 183 is successful (meaning if the lock is available and obtained). A read lock for a data item is not available if it is already locked by other activities for write. A write lock for a data item is not available if it is already locked by other activities for read. Note that a write lock for a data item is available even if the data item is locked by other activities for write (assuming the data item is not locked by other activities for read). If the read or write lock cannot be obtained, the pre-locking step proceeds to the step 185 to wait for the lock to become available. Then the step 186 is performed to find out if the lock has been released by other activities. If not, the step 185 is again performed. If yes, the routine returns to the step 181.

Figure 7:
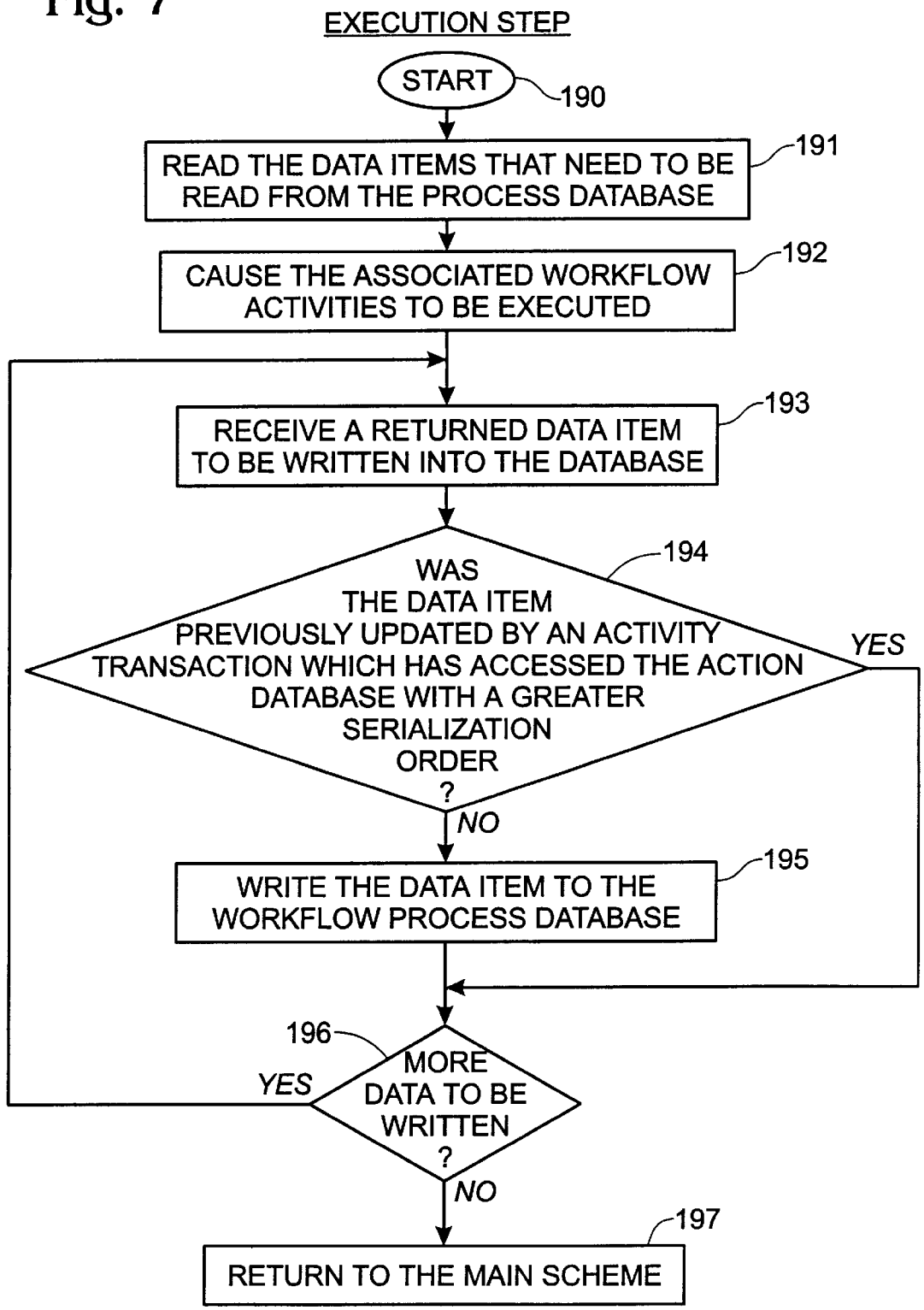

FIG. 7 shows the routine of the execution step 172 of FIG. 5. As can be seen from FIG. 7, the routine starts at the step 190. At the step 191, the data items are read from the workflow process database. At the step 192, the associated workflow activities are executed. At this time, the executed workflow activities also access and update the action database and produce a returned data item to be written into the workflow process database.

At the step 193, the returned data item is received. At the step 194, it is determined if the data item to be updated was previously updated by an activity transaction which has accessed the same action database with a greater serialization order. If not, the data item is updated at the step 195. Otherwise, the step 195 is skipped. At the step 196, it is then determined if more returned data items need to be written into the workflow process database. If so, the step 193 is repeated. If not, the routine returns to the main scheme at the step 197.

Figure 8:
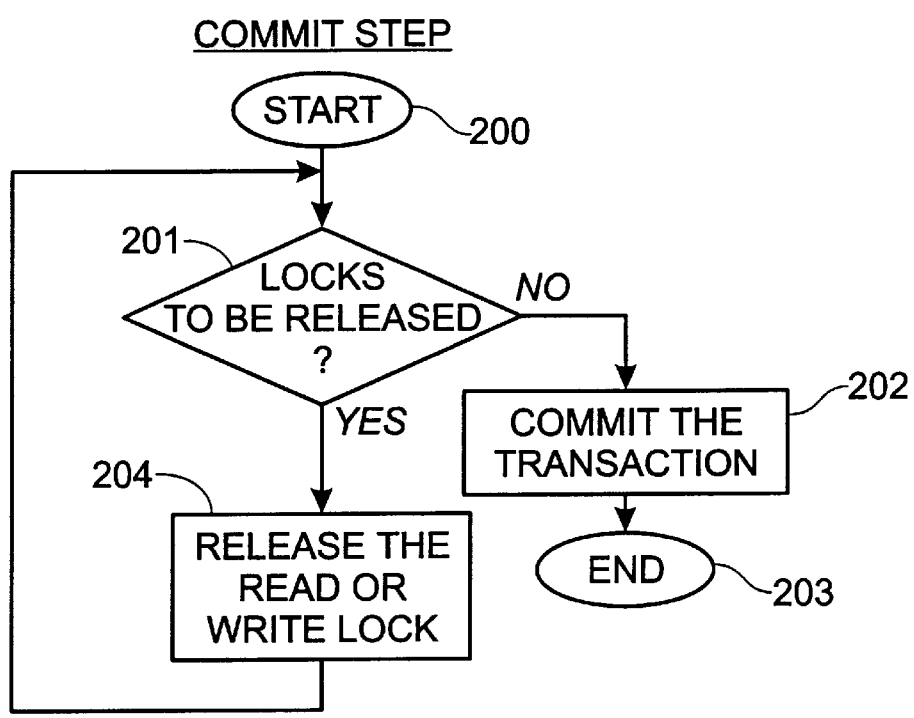
Figure 9:
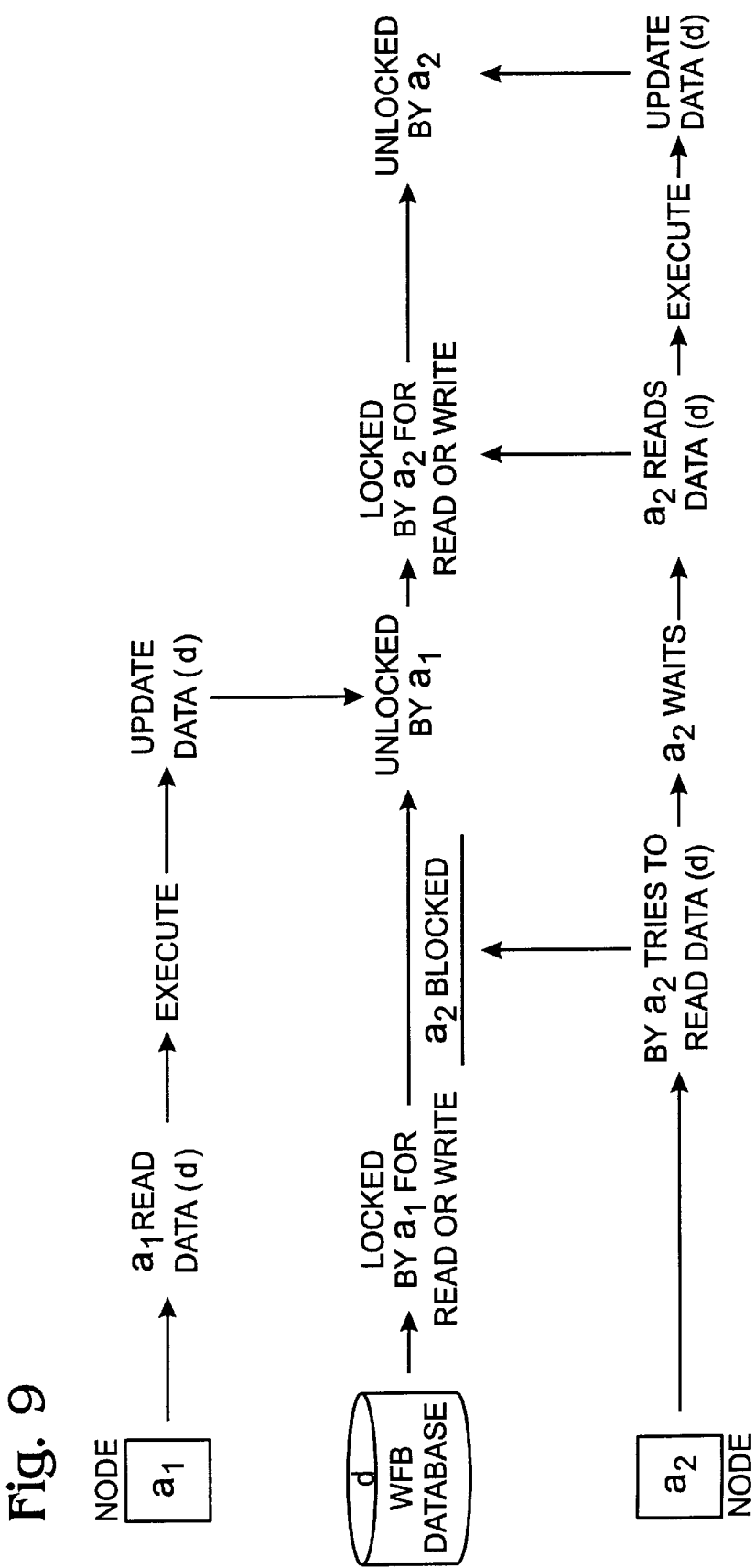
FIG. 9 is a time line diagram showing activities of the parallel nodes of FIG. 6 in accessing the workflow process database under the pre-locking protocol of the invention.

FIG. 8 shows the commit step of the pre-locking protocol of FIG. 5. As can be seen from FIG. 8, the routine starts at the step 200. At the step 201, it is determined if there is a lock to be released. If so, the step 204 is performed to release the lock. The routine then returns to the step 201. If, at the step 201, it is determined that there is no lock to be released, the routine moves to the step 202 at which the transaction is committed. The routine then ends at the step 203.

The main advantages of the above described protocol are that it ensures serializability of the overall execution and that the three substeps in the execution step can interleave. In other words, an activity transaction can read and update the workflow process database at any time and in any order. The protocol allows for concurrent execution of activity transactions that update common data items in the workflow process database. Transactions that read-write or write-read conflict on the workflow process database, however, have to be sequentially scheduled to ensure overall serializability.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A workflow management system, comprising:

workflow process that includes at least one sequence of workflow actions including a first action and a second action;

workflow database for holding a data item associated with the workflow process;

workflow engine that controls accesses to the work flow database by scheduling the first action and the second action for concurrent execution if the first action and second action both write the data item and by scheduling the first and the second action for non-concurrent execution by locking the data item before the first action is executed and then unlocking the data item after the first action is completed such that the second action cannot access the data item until the first action has completed if one of the first or second action reads the data item and another of the first or second action writes the data item.

2. The workflow management system of claim 1, wherein the workflow engine schedules the first and the second action for non-concurrent execution by locking the data item before the first action is executed and then unlocking the data item after the first action is completed such that the second action cannot write the data item until the first action has completed if the first action reads the data item and the second action writes the data item.

3. The workflow management system of claim 1, wherein the workflow engine schedules the first and the second action for non-concurrent execution by locking the data item before the first action is executed and then unlocking the data item after the first action is completed such that the second action cannot read the data item until the first action has completed if the first action writes the data item and the second action reads the data item.

4. A workflow management system, comprising:

workflow process that includes at least one sequence of workflow actions including a first action and a second action;

workflow database for holding a data item associated with the workflow process;

workflow engine that controls accesses to the work flow database by scheduling the first action and the second action for concurrent execution if the first action and second action both write the data item and by scheduling the first and the second action for non-concurrent execution if one of the first or second action read the data item and another of the first or second action write the data item, wherein the workflow engine schedules the first action and the second action for concurrent execution by performing the following steps:

locking the data item;

scheduling the first action for execution and then scheduling the second action for execution such that the first and second action each return a corresponding set of data for writing to the data item;

if the first action returns the data before the second action returns the data, then writing the data item with the data returned by the first action and then writing the data item with the data returned by the second action;

if the second action returns the data before the first action returns the data, then writing the data item with the data returned by the second action and then ignoring the data returned by the first action;

unlocking the data item.

5. The workflow management system of claim 4, wherein the first and second actions obtain the corresponding data from another database.

6. An apparatus for workflow management, comprising:

means for performing at least one sequence of workflow actions including a first action and a second action;

means for holding a data item associated with the workflow process;

means for controlling accesses to the work flow database including means for scheduling the first action and the second action for concurrent execution if the first action and second action both write the data item and means for scheduling the first and the second action for non-concurrent execution by locking the data item before the first action is executed and then unlocking the data item after the first action is completed such that the second action cannot access the data item until the first action has completed if one of the first or second action read the data item and another of the first or second action write the data item.

7. The apparatus of claim 6, wherein the means for scheduling the first and the second action for non-concurrent execution includes means for locking the data item before the first action is executed and means for unlocking the data item after the first action is completed such that the second action cannot write the data item until the first action has completed if the first action reads the data item and the second action writes the data item.

8. The apparatus of claim 6, wherein the means for scheduling the first and the second action for non-concurrent execution includes means for locking the data item before the first action is executed and means for unlocking the data item after the first action is completed such that the second action cannot read the data item until the first action has completed if the first action writes the data item and the second action reads the data item.

9. The apparatus of claim 6, wherein the means for scheduling the first action and the second action for concurrent execution comprises:

means for locking the data item;

means for scheduling the first action and the second action for execution such that the first and second action each return a corresponding set of data for writing to the data item;

means for writing the data item with the data returned by the first action and then writing the data item with the data returned by the second action if the first action returns the data before the second action returns the data;

means for writing the data item with the data returned by the second action and ignoring the data returned by the first action if the second action returns the data before the first action returns the data;

means for unlocking the data item.

10. The apparatus of claim 9, further comprising means for obtaining the corresponding data returned by the first and second actions from another database.

* * * * *